(No Model.)

M. McMULLIN.
LUBRICATOR.

No. 297,616. Patented Apr. 29, 1884.

Witnesses:
W. J. Johnston
J. H. McDonald

Inventor:
Michael McMullin
By Edward J. Underwood
Attorney

UNITED STATES PATENT OFFICE.

MICHAEL McMULLIN, OF DENVER, COLORADO.

LUBRICATOR.

SPECIFICATION forming part of Letters Patent No. 297,616, dated April 29, 1884.

Application filed June 20, 1883. (No model.)

*To all whom it may concern:*

Be it known that I, MICHAEL MCMULLIN, a citizen of Ontario, Canada, and now residing at Denver, in the county of Arapahoe and State of Colorado, have invented certain new and useful Improvements in Automatic Oil-Cups or Lubricating Devices, of which the following is a specification.

My invention relates to an automatic oil-cup or lubricating device in which the oil is allowed to thoroughly settle in one reservoir, and then pass through pipes into another reservoir, and from there conveyed through another pipe whose mouth or opening is near top of reservoir, and from there passing automatically through pipe and falling so that it can be viewed by operator.

The object of my invention is to provide a perfect lubricating-cup for oiling all kinds of stationary machinery. Experiments have demonstrated to me that a perfect lubricating arrangement must be so constructed as to allow the operator to see exactly the amount of oil flowing to the bearing, and so arranged as to allow of a greater or less amount, at the will of the attendant, to flow steadily to said bearing. Experiments have also demonstrated to me the necessity of having the oil flowing into the pipe from reservoir to said bearing perfectly free from any sediment or settling; and to accomplish this I take the oil from one reservoir, after being settled, into another reservoir, and then from the second reservoir I take the oil to bearing through a pipe the mouth or opening of which is near the top of second reservoir. Experience has also demonstrated that particles of dust, &c., will naturally fall through opening where operator looks to view the amount of oil flowing onto bearing; and to obviate this I provide a covering for same when operator is not viewing the said opening. I attain these objects by the mechanism illustrated in the accompanying drawings, of which—

Figure 2:
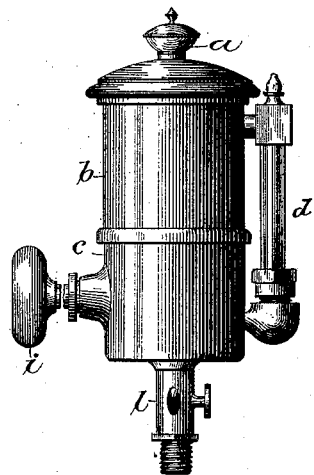
Figure 1:
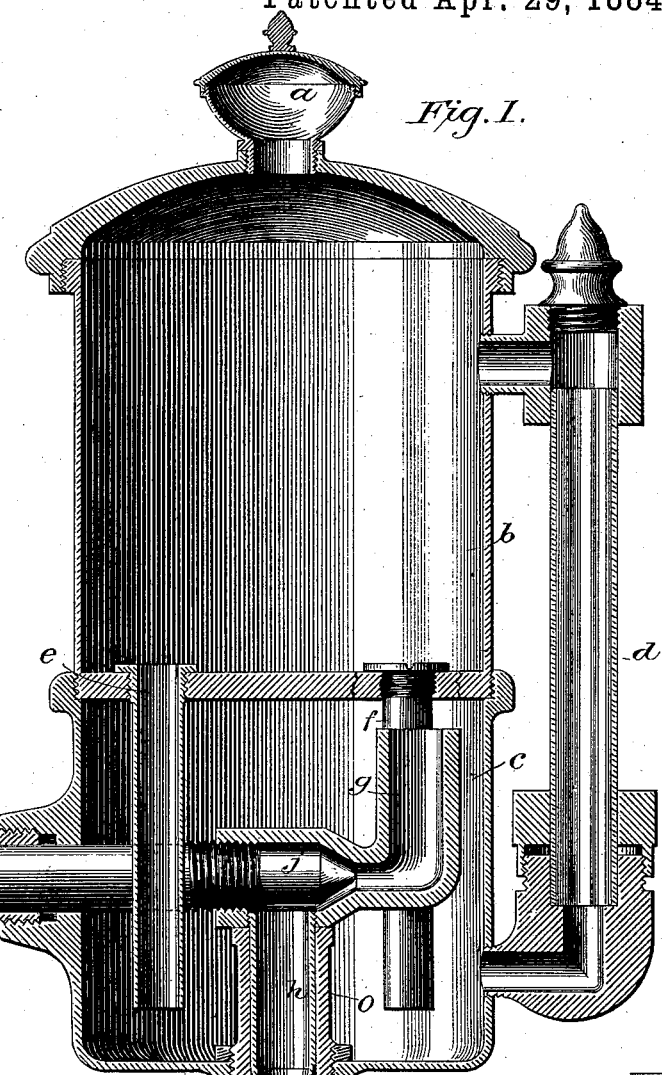
Figure 4:
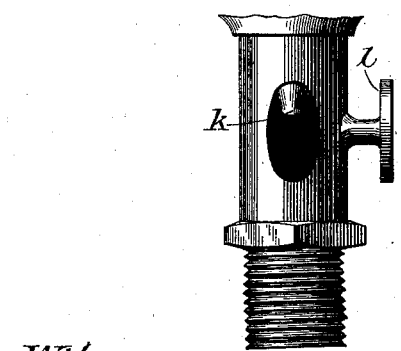
Figure 3:
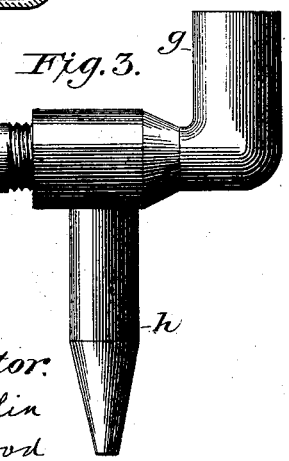

Figure 1 is a sectional view of the whole device. Fig. 2 is an outside view of whole device. Fig. 3 is a view of tube from which oil flows upon bearing, the mouth or opening of which is near top of reservoir. Fig. 4 is the view of the device through which operator sees oil flowing from end of pipe shown in Fig. 3, and also having revolving cylinder on outside capable of being turned, entirely shutting off opening.

Similar letters refer to similar parts throughout the several views.

$a$ shows an opening at top, through which oil is poured into first reservoir.

$b$ shows first reservoir, on the bottom of which the settlings or sediment of the oil settles.

$c$ shows second reservoir, and any sediment left can be again allowed to settle.

$d$ shows glass tube allowing operator to see how much oil is in reservoirs.

$e$ and $f$ show pipes for conducting oil from the reservoir $b$ to reservoir $c$. Each of these pipes is provided with a flange which rests upon the bottom of reservoir $b$, and in effect constitutes a trap whereby settled sediment is prevented from entering reservoir $c$.

$g$ shows opening of pipe shown in Fig. 3, the top of said opening being nearly at top of reservoir $c$, so any sediment in reservoir $c$ can by no possibility pass on to bearing.

$h$ shows end of pipe, so as to form small stream or drop of oil as it flows out.

$i\ j$ show device for regulating the amount of oil to pass through pipe as shown in Fig. 1, and allowing operator, at will, to increase or diminish amount flowing, or to entirely stop the flow.

$k$ shows position of end of pipe $h$ with respect to openings in pipe $o$, whereby the operator, when the cut-off sleeve is turned around, can see amount of flowing lubricant.

$l$ shows a sleeve or device for turning around over opening in pipe $o$, completely shutting off the hole, to keep out dust, &c.

$k$, Fig. 4, shows more fully how end of pipe $h$ is seen through hole in sleeve $o$, and how plainly operator sees amount of flowing lubricant.

What I claim as my invention, and desire to secure by Letters Patent, is—

1. The oil-reservoirs $b$ and $c$, the former having an opening, $a$, said reservoirs communicating with each other by means of the flanged pipes $e$ and $f$, and the pipe $g\ h$, provided with the conical-end regulating-screw $i\ j$, and the tube $o$, provided with the oval opening capable of being closed to exclude dust, and sleeve or cut-off $l$, and the glass tube $d$, whereby the flow of oil is observed and regulated through the pipe $g\ h$, as and for the purpose set forth.

2. The combination, with the reservoirs $b$ and $c$, of the flanged pipes $e$ and $f$, the pipe $g\ h$, the regulating-screw $i\ j$, the tube $o$, and the cut-off $l$, constructed, arranged, and operating substantially as herein described.

MICHAEL McMULLIN.

Witnesses:
HENRY J. CURRAN,
JOSEPH LEAF.